US010051261B2

United States Patent
Guo et al.

(10) Patent No.: US 10,051,261 B2
(45) Date of Patent: Aug. 14, 2018

(54) THREE-DIMENSIONAL IMAGE DISPLAYING SYSTEM, METHOD, AND APPARATUS

(71) Applicant: Huawei Device (Dongguan) Co., Ltd., Dongguan (CN)

(72) Inventors: Zejin Guo, Shanghai (CN); Feng He, Shanghai (CN); Bin Wu, Shanghai (CN)

(73) Assignee: HUAWEI DEVICE (DONGGUAN) CO., LTD., Dongguan (CN)

( * ) Notice: Subject to any disclaimer, the term of this patent is extended or adjusted under 35 U.S.C. 154(b) by 306 days.

(21) Appl. No.: 14/586,273

(22) Filed: Dec. 30, 2014

(65) Prior Publication Data

US 2015/0245014 A1 Aug. 27, 2015

Related U.S. Application Data

(63) Continuation of application No. PCT/CN2014/072380, filed on Feb. 21, 2014.

(51) Int. Cl.
*H04N 13/04* (2006.01)
*G02B 27/22* (2018.01)
(Continued)

(52) U.S. Cl.
CPC ..... *H04N 13/0402* (2013.01); *G02B 26/0875* (2013.01); *G02B 27/2264* (2013.01);
(Continued)

(58) Field of Classification Search
CPC .......... H04N 13/0497; H04N 13/0493; H04N 13/042; H04N 13/0402; G02B 26/0875;
(Continued)

(56) References Cited

U.S. PATENT DOCUMENTS 6,144,420 A 11/2000 Jung
6,906,762 B1 6/2005 Witehira et al.
(Continued)

FOREIGN PATENT DOCUMENTS

CN 1200491 A 12/1998
CN 1294695 A 5/2001
(Continued)

OTHER PUBLICATIONS

Partial English Translation and Abstract of Japanese Patent Application No. JPA2002169124, Dec. 7, 2016, 36 pages.
(Continued)

*Primary Examiner* — Sathyanaraya V Perungavoor
*Assistant Examiner* — Peet Dhillon
(74) *Attorney, Agent, or Firm* — Conley Rose, P.C.

(57) ABSTRACT

A three-dimensional image displaying system includes a drive controller, a display panel, a refraction variable part, and a lens. The drive controller is configured to display a slice image of a stereoscopic object on the display panel according to a set sequence and control, according to a depth of the slice image in the stereoscopic object, refraction intensity of the refraction variable part for a light ray projected by the display panel when the slice image is displayed on the display panel. A time required for successively displaying all slice images, which are of the stereoscopic object to be imaged and are perpendicular to one visual axis, on the display panel at a time according to the set sequence is less than a time of persistence of vision. The display panel is configured to display the slice image under control of the drive controller. The lens is configured to perform imaging according to a light ray refracted by the refraction variable part.

19 Claims, 11 Drawing Sheets

(51) Int. Cl.
*G02B 27/26* (2006.01)
*G02B 26/08* (2006.01)

(52) U.S. Cl.
CPC ..... *G02B 27/2278* (2013.01); *G02B 27/2285* (2013.01); *G02B 27/26* (2013.01); *H04N 13/042* (2013.01); *H04N 13/0493* (2013.01); *H04N 13/0497* (2013.01)

(58) Field of Classification Search
CPC ................ G02B 27/26; G02B 27/2285; G02B 27/2264; G02B 27/2278
See application file for complete search history.

(56) References Cited

U.S. PATENT DOCUMENTS

| | | | |
|---|---|---|---|
| 2001/0013960 A1 | 8/2001 | Popovich et al. | |
| 2003/0067421 A1* | 4/2003 | Sullivan | G02B 27/2278 345/6 |
| 2003/0197933 A1* | 10/2003 | Sudo | H04N 13/021 359/464 |
| 2005/0057812 A1* | 3/2005 | Raber | G02B 17/0896 359/619 |
| 2008/0192111 A1* | 8/2008 | Ijzernnan | H04N 13/0495 348/51 |
| 2011/0149046 A1 | 6/2011 | Chang | |
| 2012/0032875 A1* | 2/2012 | Sprowl | G02B 27/01 345/156 |
| 2012/0256879 A1* | 10/2012 | Liu | G02B 27/26 345/175 |

FOREIGN PATENT DOCUMENTS

| | | |
|---|---|---|
| CN | 101783966 A | 7/2010 |
| CN | 102103266 A | 6/2011 |
| CN | 102447935 A | 5/2012 |
| JP | 2002169124 A | 6/2002 |
| JP | 2007514190 A | 5/2007 |
| TW | 391702 B | 4/2013 |
| WO | 2005057250 A2 | 6/2005 |
| WO | 2005069058 A1 | 7/2005 |
| WO | 2005120084 A2 | 12/2005 |
| WO | WO 2005120084 A2 * 12/2005 | ............... G03H 1/08 |
| WO | 2006017771 A1 | 2/2006 |

OTHER PUBLICATIONS

Partial English Translation and Abstract of Japanese Patent Application No. JPA2007514190, Dec. 7, 2016, 85 pages.
Foreign Communication From a Counterpart Application, Chinese Application No. 2016520246, Chinese Office Action dated Oct. 18, 2016, 3 pages.
Foreign Communication From a Counterpart Application, Chinese Application No. 2016520246, English Translation of Chinese Office Action dated Oct. 18, 2016, 4 pages.
Foreign Communication From a Counterpart Application, PCT Application No. PCT/CN2014/072380, International Search Report dated Oct. 27, 2014, 11 pages.
Foreign Communication From a Counterpart Application, PCT Application No. PCT/CN2014/072380, Written Opinion dated Oct. 27, 2014, 4 pages.
Pastoor, S., et al., "3-D displays: A review of current technologies," Elsevier, Dec. 11, 1996, pp. 100-110.
Foreign Communication From a Counterpart Application, European Application No. 14812391.2, Extended European Search Report dated Aug. 25, 2015, 16 pages.
Foreign Communication From a Counterpart Application, Chinese Application No. 201480060092.0, Chinese Office Action dated Dec. 2, 2016, 7 pages.

* cited by examiner

THREE-DIMENSIONAL IMAGE DISPLAYING SYSTEM, METHOD, AND APPARATUS

CROSS-REFERENCE TO RELATED APPLICATIONS

This application is a continuation of International Application No. PCT/CN2014/072380, filed on Feb. 21, 2014, which is incorporated by reference in its entirety.

TECHNICAL FIELD

The present invention relates to the field of three-dimensional displaying technologies, and in particular, to a three-dimensional image displaying system, method, and apparatus.

BACKGROUND

A current three-dimensional displaying technology is mainly a binocular stereoscopic parallax displaying technology. The binocular stereoscopic parallax displaying technology enables the left and right eyes of an observer to see left and right images with a certain parallax of an image pair, respectively, so that the observer can see a three-dimensional image. That is, the binocular stereoscopic parallax displaying technology separates an image signal of a picture of a stereoscopic image into left-eye image data and right-eye image data. When an image signal corresponding to the left-eye image data is displayed, the observer identifies the image signal corresponding to the left-eye image data with the left eye. When an image signal corresponding to the right-eye image data is displayed, the observer identifies the image signal corresponding to the right-eye image data with the right eye. Therefore, the observer can identify the stereoscopic image.

Because an image displayed by using a binocular stereoscopic parallax displaying technology is planar, the displayed image cannot be integrated with a realistic environment. In addition, an observer can see a stereoscopic image only by wearing dedicated stereoscopic imaging glasses. Moreover, when a binocular stereoscopic parallax displaying technology is used, to see a displayed image an observer needs to place a focus point of two eyes on a display screen of a displaying apparatus. But to identify a stereoscopic image according to the displayed image, the observer does not place a convergence point of lines of sight of the two eyes on the display screen. Because a focus point of two eyes of an observer is not on a same plane as a convergence point of lines of sight, a visual disorder and visual fatigue may be easily generated.

To sum up, an image displayed by using a binocular stereoscopic parallax displaying technology cannot be integrated with an environment. Moreover, when a binocular stereoscopic parallax displaying technology is used, an observer can see a stereoscopic image only by wearing dedicated stereoscopic imaging glasses. In addition, when a binocular stereoscopic parallax displaying technology is used, a focus point of two eyes of an observer is not on a same plane as a convergence point of lines of sight. Therefore, a visual disorder and visual fatigue may be easily generated.

SUMMARY

Embodiments of the present invention provide a three-dimensional image displaying system, method, and apparatus, which integrates a displayed three-dimensional image with an environment and relieves visual fatigue when an observer watches a three-dimensional image.

According to a first aspect, a three-dimensional image displaying system is provided and includes a drive controller, a display panel, a refraction variable part, and a lens. The drive controller is configured to display a slice image of a stereoscopic object on the display panel according to a set sequence and control, according to a depth of the slice image in the stereoscopic object, refraction intensity of the refraction variable part for a light ray projected by the display panel when the slice image is displayed on the display panel. A time required for successively displaying all slice images, which are of the stereoscopic object to be imaged and are perpendicular to one visual axis, on the display panel at a time according to the set sequence is less than a time of persistence of vision. The display panel is configured to display the slice image under control of the drive controller. The refraction variable part is configured to perform, according to the refraction intensity controlled by the drive controller, refraction on the light ray projected by the display panel. The lens is configured to perform imaging according to a light ray refracted by the refraction variable part.

With reference to the first aspect, in a first possible implementation manner, for two slice images that are of a same stereoscopic object and are perpendicular to one visual axis, a distance between an image formed from a slice image with a larger depth in the stereoscopic object and a three-dimensional image receiving part is greater than a distance between an image formed from a slice image with a smaller depth in the stereoscopic object and the three-dimensional image receiving part. An image formed from one slice image is an image formed after a refracted light ray passes through the lens when the one slice image is displayed on the display panel, where the refracted light ray is obtained after a light ray projected by the display panel is refracted by the refraction variable part according to the refraction intensity controlled by the drive controller.

With reference to the first aspect, in a second possible implementation manner, the drive controller is configured to display the slice image of the stereoscopic object on the display panel according to the set sequence and control a thickness of the refraction variable part according to the depth of the slice image in the stereoscopic object when the slice image is displayed on the display panel.

With reference to the first aspect, in a third possible implementation manner, the drive controller is configured to display the slice image of the stereoscopic object on the display panel according to the set sequence and control a refractive index of a material of the refraction variable part according to the depth of the slice image in the stereoscopic object when the slice image is displayed on the display panel.

With reference to the first aspect, in a fourth possible implementation manner, the system further includes a projection light source and a projection light source reflector, where the projection light source reflector is configured to reflect a light ray emitted by the projection light source onto the display panel.

With reference to the fourth possible implementation manner of the first aspect, in a fifth possible implementation manner, an optical path between the display panel and the refraction variable part passes through the projection light source reflector. The projection light source reflector is further configured to transmit a light ray between the display panel and the refraction variable part.

With reference to the fifth possible implementation manner of the first aspect, in a sixth possible implementation manner, the system further includes an angle-adjustable reflector, a photosensitive panel, and a light filter. The drive controller is further configured to adjust an image formed by a three-dimensional image receiving part and/or an image formed by performing an operation action on a three-dimensional image onto the photosensitive panel by adjusting the angle-adjustable reflector. The image formed by a three-dimensional image receiving part is an image formed by the three-dimensional image receiving part by successively using the angle-adjustable reflector, the lens, the refraction variable part, the projection light source reflector, and the light filter. The image formed by performing an operation action on a three-dimensional image is an image formed by the action by successively using the angle-adjustable reflector, the lens, the refraction variable part, the projection light source reflector, and the light filter. The light filter is configured to absorb a light ray that the projection light source irradiates onto the photosensitive panel.

With reference to the sixth possible implementation manner of the first aspect, in a seventh possible implementation manner, the system further includes an external light source, where the external light source is configured to enhance light intensity surrounding the three-dimensional image receiving part and/or an operator of executing an operation action. When the external light source is an infrared light source, the light filter is an infrared cut-off filter located between the projection light source and the photosensitive panel and between the projection light source reflector and the photosensitive panel. When the external light source is a light source of natural light, the light filter includes two polarizers that are mutually perpendicular in a polarization direction, where one of the two polarizers is located between the projection light source and the projection light source reflector and the other is located between the projection light source reflector and the photosensitive panel.

With reference to the sixth possible implementation manner of the first aspect, in an eighth possible implementation manner, if the image formed on the photosensitive panel includes the image formed by performing an operation action on a three-dimensional image, the drive controller is further configured to determine an operation instruction according to the image formed by the operation action on the photosensitive panel and re-perform imaging on the stereoscopic object according to the determined operation instruction.

According to a second aspect, a three-dimensional image displaying method is provided and includes displaying a slice image of a stereoscopic object on a display panel according to a set sequence, and controlling, according to a depth of the slice image in the stereoscopic object, refraction intensity of a refraction variable part for a light ray projected by the display panel when the slice image is displayed on the display panel, where a light ray refracted by the refraction variable part is imaged through a lens, and where a time required for successively displaying all slice images, which are of the stereoscopic object to be imaged and are perpendicular to one visual axis, on the display panel at a time according to the set sequence is less than a time of persistence of vision.

With reference to the second aspect, in a first possible implementation manner, for two slice images that are of a same stereoscopic object and are perpendicular to one visual axis, a distance between an image formed from a slice image with a larger depth in the stereoscopic object and a three-dimensional image receiving part is greater than a distance between an image formed from a slice image with a smaller depth in the stereoscopic object and the three-dimensional image receiving part, where an image formed from one slice image is an image formed after a refracted light ray passes through the lens when the one slice image is displayed on the display panel, and where the refracted light ray is obtained after a light ray projected by the display panel is refracted by the refraction variable part according to the refraction intensity controlled by the drive controller.

With reference to the second aspect, in a second possible implementation manner, the controlling includes controlling a thickness of the refraction variable part according to the depth of the slice image in the stereoscopic object when the slice image is displayed on the display panel.

With reference to the second aspect, in a third possible implementation manner, the controlling includes controlling a refractive index of a material of the refraction variable part according to the depth of the slice image in the stereoscopic object when the slice image is displayed on the display panel.

With reference to the second aspect, in a fourth possible implementation manner, the three-dimensional image displaying method provided in the embodiment of the present invention further includes adjusting an image formed by a three-dimensional image receiving part and/or an image formed by performing an operation action on a three-dimensional image onto a photosensitive panel by adjusting an angle-adjustable reflector, where the image formed by a three-dimensional image receiving part is an image formed by the three-dimensional image receiving part by successively using the angle-adjustable reflector, the lens, the refraction variable part, a projection light source reflector configured to reflect a light ray emitted by a projection light source onto the display panel, and a light filter configured to absorb a light ray that the projection light source irradiates onto the photosensitive panel, and where the image formed by performing an operation action on a three-dimensional image is an image formed by the action by successively using the angle-adjustable reflector, the lens, the refraction variable part, the projection light source reflector, and the light filter.

With reference to the fourth possible implementation manner of the second aspect, in a fifth possible implementation manner, if the image formed on the photosensitive panel includes the image formed by performing an operation action on a three-dimensional image, the method further includes determining an operation instruction according to the image formed by the operation action on the photosensitive panel and re-performing imaging on the stereoscopic object according to the determined operation instruction.

According to a third aspect, a three-dimensional image displaying apparatus is provided and includes a displaying unit configured to display a slice image of a stereoscopic object on a display panel according to a set sequence, and a control unit configured to control, according to a depth of the slice image in the stereoscopic object, refraction intensity of a refraction variable part for a light ray projected by the display panel when the slice image is displayed on the display panel, where a light ray refracted by the refraction variable part is imaged through a lens, and where a time required for successively displaying all slice images, which are of the stereoscopic object to be imaged and are perpendicular to one visual axis, on the display panel at a time according to the set sequence is less than a time of persistence of vision.

With reference to the third aspect, in a first possible implementation manner, the control unit is configured to control a thickness of the refraction variable part according to the depth of the slice image in the stereoscopic object when the slice image is displayed on the display panel.

With reference to the third aspect, in a second possible implementation manner, the control unit is configured to control a refractive index of a material of the refraction variable part according to the depth of the slice image in the stereoscopic object when the slice image is displayed on the display panel.

With reference to the third aspect, in a third possible implementation manner, the apparatus further includes an adjusting unit, where the adjusting unit is configured to adjust an image formed by a three-dimensional image receiving part and/or an image formed by performing an operation action on a three-dimensional image onto a photosensitive panel by adjusting an angle-adjustable reflector, where the image formed by a three-dimensional image receiving part is an image formed by the three-dimensional image receiving part by successively using the angle-adjustable reflector, the lens, the refraction variable part, a projection light source reflector configured to reflect a light ray emitted by a projection light source onto the display panel, and a light filter configured to absorb a light ray that the projection light source irradiates onto the photosensitive panel, and where the image formed by performing an operation action on a three-dimensional image is an image formed by the action by successively using the angle-adjustable reflector, the lens, the refraction variable part, the projection light source reflector, and the light filter.

With reference to the third possible implementation manner of the third aspect, in a fourth possible implementation manner, if the image formed on the photosensitive panel includes the image formed by performing an operation action on a three-dimensional image, the adjusting unit is further configured to determine an operation instruction according to the image formed by the operation action on the photosensitive panel and re-perform imaging on the stereoscopic object according to the determined operation instruction.

According to the three-dimensional image displaying system, method, and apparatus provided in the embodiments of the present invention, a drive controller in the system displays a slice image of a stereoscopic object on a display panel according to a set sequence and controls, according to a depth of the slice image in the stereoscopic object, refraction intensity of the refraction variable part for a light ray projected by the display panel when the slice image is displayed on the display panel. That is, when slice images with different depths in the stereoscopic object are displayed on the display panel, the refraction variable part has different refraction intensity for light rays projected by the display panel, which is equivalent to that, when the slice images with different depths in the stereoscopic object are displayed on the display panel, a distance between the display panel and a lens, namely, an object distance, is different. Therefore, after a light ray projected by the display panel is imaged through the lens, an obtained distance between an image plane and the lens, namely, an image distance, is also different. When a time required for successively displaying all slice images, which are of the stereoscopic object to be imaged and are perpendicular to one visual axis, on the display panel at a time according to the set sequence is less than a time of persistence of vision, an observer can see a stereoscopic image formed, in space, by images that are formed after the slice images of the stereoscopic object pass through the lens. A stereoscopic image is formed when the three-dimensional image displaying system provided in the embodiments of the present invention is used to perform imaging on a stereoscopic object, thereby avoiding various defects in using a current binocular stereoscopic parallax displaying technology to display a three-dimensional image. For example, when a displayed image cannot be integrated with an environment, an observer needs to wear dedicated stereoscopic imaging glasses and a visual disorder and visual fatigue may be easily generated because a focus point of two eyes is not on a same plane as a convergence point of lines of sight.

BRIEF DESCRIPTION OF DRAWINGS

To describe the technical solutions in the embodiments of the present invention more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

According to a three-dimensional image displaying system, method, and apparatus provided in embodiments of the present invention, a stereoscopic image is formed when the three-dimensional image displaying system provided in the embodiments of the present invention is used to perform imaging on a stereoscopic object, thereby avoiding various defects in using a current binocular stereoscopic parallax displaying technology to display a three-dimensional image. For example, when a displayed image cannot be integrated with an environment, an observer needs to wear dedicated stereoscopic imaging glasses and a visual disorder and visual fatigue may be easily generated because a focus point of two eyes is not on a same plane as a convergence point of lines of sight.

Figure 1:
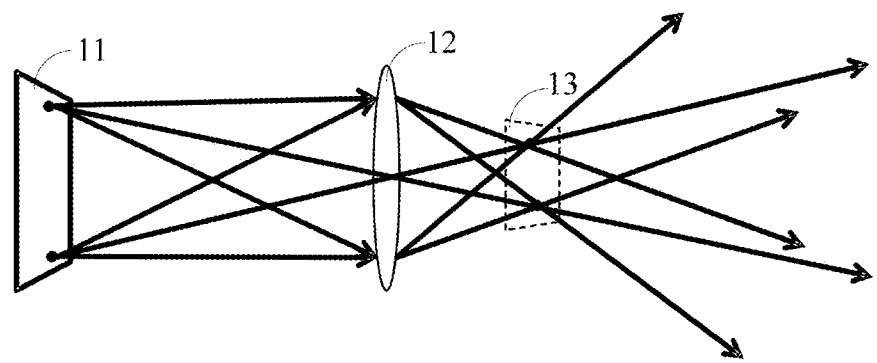
FIG. 1 is a diagram of an optical path for imaging of a two-dimensional image in the prior art.

FIG. 1 shows an optical path when a two-dimensional image is imaged by using a lens. Light rays on a two-dimensional image 11 are refracted after passing through a lens 12. An image of the two-dimensional image 11 is formed at intersections of the refracted light rays. A plane where the image of the two-dimensional image 11 is located is an image plane 13. When eyes of an observer is located in a cone area in right front of the image plane, a complete image of the two-dimensional image 11 can be seen on the image plane.

The following describes specific implementation manners of a three-dimensional image displaying system, method, and apparatus provided in the embodiments of the present invention with reference to the accompanying drawings in the specification.

Figure 2:
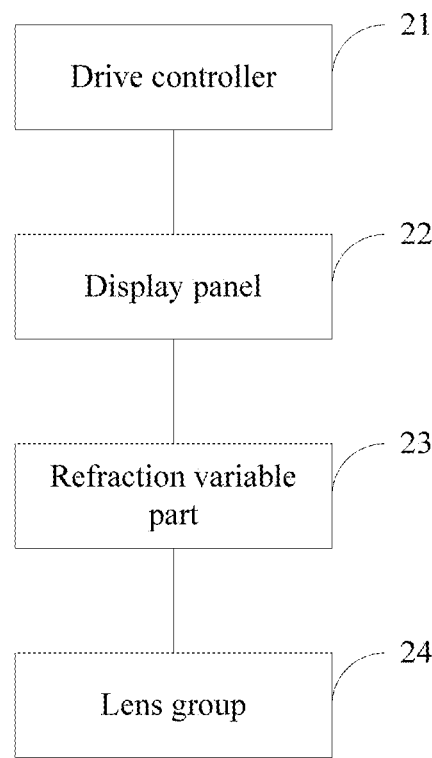
FIG. 2 is a first schematic structural diagram of a three-dimensional image displaying system according to an embodiment of the present invention.

A three-dimensional image displaying system provided in an embodiment of the present invention, as shown in FIG. 2, includes a drive controller 21, a display panel 22, a refraction variable part 23, and a lens 24.

The drive controller 21 is configured to display a slice image of a stereoscopic object on the display panel 22 according to a set sequence and control, according to a depth of the slice image in the stereoscopic object, refraction intensity of the refraction variable part 23 for a light ray projected by the display panel 22 when the slice image is displayed on the display panel 22, where a time required for successively displaying all slice images, which are of the stereoscopic object to be imaged and are perpendicular to one visual axis, on the display panel 22 at a time according to the set sequence is less than a time of persistence of vision.

The drive controller 21 may be a device that is separate in a physical form and controls display of a slice image on the display panel 22 and refraction intensity of the refraction variable part 23. The drive controller 21 may also include two devices that are separate in a physical form but are mutually associated, where one of the devices controls display of a slice image on the display panel 22 and the other controls refraction intensity of the refraction variable part 23.

The display panel 22 is configured to display the slice image under control of the drive controller 21.

The refraction variable part 23 is configured to perform, according to the refraction intensity controlled by the drive controller 21, refraction on the light ray projected by the display panel 22.

The lens 24 is configured to perform imaging according to a light ray refracted by the refraction variable part 23.

In one embodiment of the present invention, the lens 24 may also be replaced by a lens group. The lens group performs imaging according to the light ray refracted by the refraction variable part 23.

A slice image refers to a projection image of a part of any stereoscopic slice on a section, where the part is visible to an observer and the stereoscopic slice is obtained by using a series of equidistant sections perpendicular to a visual axis of the observer to section a stereoscopic object.

A distance between each section (where, an image of each section is a slice image) perpendicular to a visual axis in a stereoscopic object and an observation point on the visual axis is a depth of a slice image corresponding to each section in the stereoscopic object. The observation point is located outside the stereoscopic object. A smaller distance between a section in the stereoscopic object and the observation point indicates a smaller depth of a slice image corresponding to the section in the stereoscopic object, and a larger distance between a section in the stereoscopic object and the observation point indicates a larger depth of a slice image corresponding to the section in the stereoscopic object.

Figure 3A:
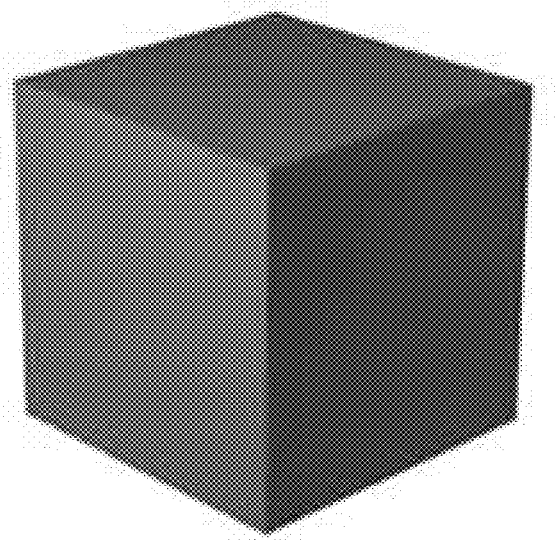
FIG. 3A and FIG. 3B are a schematic diagram of a stereoscopic object and a schematic diagram of a slice image of the stereoscopic object, respectively.
Figure 3B:
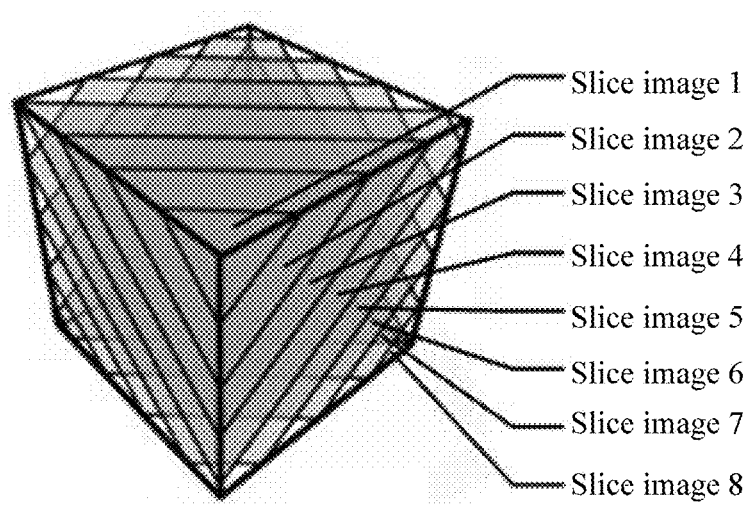

In an application scenario, the stereoscopic object may be a cube shown in FIG. 3A and slice images that are of the stereoscopic object and perpendicular to a visual axis are shown in FIG. 3B. When slice images of the cube shown in FIG. 3A are displayed on the display panel, the slice images may be displayed according to the following sequence: a slice image 1, a slice image 2, a slice image 3, a slice image 4, a slice image 5, a slice image 6, a slice image 7, and a slice image 8. Certainly, the slice images may also be displayed according to another sequence.

The display panel is configured to display a slice image. The display panel may be a digital micromirror device, a liquid crystal on silicon panel, a liquid crystal display panel, a light-emitting diode display panel, or another device capable of displaying an image. The display panel may be a display panel with red, green, and blue integrated, or may also include three display panels with red, green, and blue separated. The refraction variable part is configured to adjust an optical path between the display panel and the lens to change a position of an image formed after a slice image displayed on the display panel passes through the lens. The lens is configured to project and image a slice image displayed on the display panel in a real scenario. The lens may include a convex lens and/or a concave lens and/or a convex mirror and/or a concave mirror.

Figure 4:
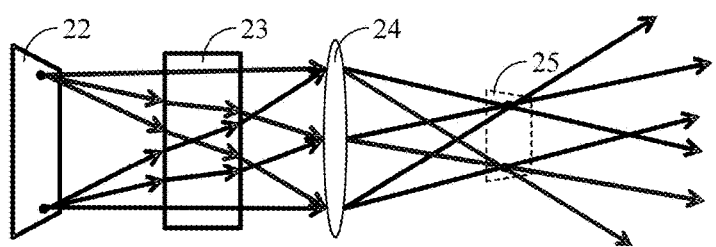
FIG. 4 is a diagram of an optical path during imaging by the three-dimensional image displaying system shown in FIG. 2.

FIG. 4 shows an optical path of the three-dimensional image displaying system provided in the embodiment of the present invention. Light rays on the display panel 22 are refracted by the refraction variable part 23. Refracted light rays are projected and imaged through the lens 24. In this way, a slice image displayed on the display panel 22 is imaged in a real scenario. A plane where an image formed from a slice image is located is an image plane 25. FIG. 4 is described by using an example that the lens is a convex lens.

Figure 5:
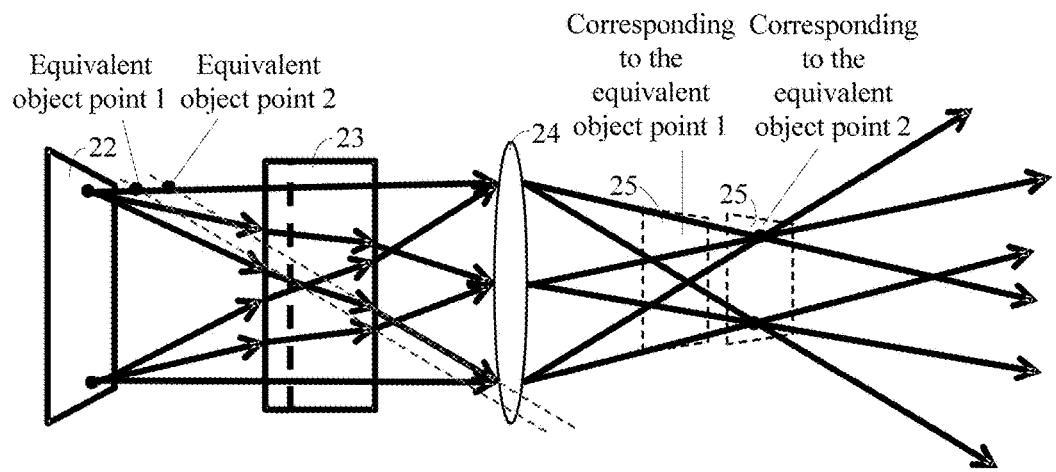
FIG. 5 is a principle diagram when the three-dimensional image displaying system shown in FIG. 2 performs imaging.

The refraction variable part in the optical path refracts a light ray projected by the display panel (when a slice image displayed on the display panel is different, a light ray projected by the display panel is different), which leads to an effect equivalent to moving the display panel, that is, equivalent to moving an image that is formed from a slice image displayed on the display panel. In FIG. 4, after a light ray on the display panel passes through the refraction variable part, an effect is equivalent to moving the display panel towards the lens for a short distance, which causes an image that is formed from a slice image displayed on the display panel to also move far away from the lens, that is, an image distance (a distance between the image that is formed from a slice image displayed on the display panel and the lens) increases. For an observer of observing an image formed from a slice image, it can be seen that the slice image is closer. As shown in FIG. 5, although an object distance, namely a distance between the display panel 22 and the lens 24, does not change, refraction intensity of the refraction variable part 23 for a light ray varies with different slice images displayed on the display panel 22. Therefore, this is equivalent to that the object distance varies with the different slice images displayed on the display panel 22, that is, an equivalent object distance, namely a distance between an equivalent object point and the lens, changes. Therefore, a distance between a plane where an image formed from a different slice image is located and the lens 24, namely an image distance, changes, that is, different slice images have different image distances.

Therefore, images formed from slice images of one stereoscopic object are arranged in image space according to a certain sequence. When a time required for successively displaying all slice images, which are of a same stereoscopic object and are perpendicular to one visual axis, on the display panel at a time according to a set sequence is less than a time of persistence of vision, an observer can see a stereoscopic image that is formed by arranging the slice images of the stereoscopic object in space according to a certain sequence.

For two slice images that are of a same stereoscopic object and are perpendicular to one visual axis, a distance between an image formed from a slice image with a larger depth in the stereoscopic object and a three-dimensional image receiving part is greater than a distance between an image formed from a slice image with a smaller depth in the stereoscopic object and the three-dimensional image receiving part, and an image formed from one slice image is an image formed after a refracted light ray passes through the lens when the one slice image is displayed on the display panel, where the refracted light ray is obtained after a light ray projected by the display panel is refracted by the refraction variable part according to the refraction intensity controlled by the drive controller.

The three-dimensional image receiving part is configured to receive a stereoscopic image of a stereoscopic object, where the stereoscopic image is formed by using the three-dimensional image displaying system provided in this embodiment of the present invention. The three-dimensional image receiving part may be an eye of an observer, or may also be another device capable of receiving an image.

From a perspective of an observer, a slice image with a larger depth in the stereoscopic object is displayed on an image plane far away from the observer, and a slice image with a smaller depth in the stereoscopic object is displayed on an image plane close to the observer. Therefore, an observer can see that images formed from slice images of a stereoscopic object are arranged in image space according to a relative position of the slice image.

An image plane formed after one slice image passes through the lens is a plane where an image formed after a refracted light ray passes through the lens is located when the one slice image is displayed on the display panel, where the refracted light ray is obtained after a light ray projected by the display panel is refracted by the refraction variable part.

It is assumed that a slice image A and a slice image B are two slice images that are of a same stereoscopic object and are perpendicular to a same visual axis, where a depth of the slice image A in the stereoscopic object is larger and a depth of the slice image B in the stereoscopic object is smaller.

When a refractive index of a medium padded between the display panel and the refraction variable part and the refractive index of the medium padded between the refraction variable part and the lens are less than a refractive index of the refraction variable part, infraction intensity of the refraction variable part for a light ray projected by the display panel when the slice image A is displayed on the display panel is less than refraction intensity of the refraction variable part for a light ray projected by the display panel when the slice image B is displayed on the display panel, that is, an equivalent object distance generated when the slice image A is displayed on the display panel is greater than an equivalent object distance generated when the slice image B is displayed on the display panel, and therefore an image distance of an image formed from the slice image A is less than an image distance of an image formed from the slice image B.

When a refractive index of a medium padded between the display panel and the refraction variable part and the refractive index of the medium padded between the refraction variable part and the lens are greater than a refractive index of the refraction variable part, infraction intensity of the refraction variable part for a light ray projected by the display panel when the slice image A is displayed on the display panel is greater than refraction intensity of the refraction variable part for a light ray projected by the display panel when the slice image B is displayed on the display panel. This is equivalent to that an equivalent object distance generated when the slice image A is displayed on the display panel is greater than an equivalent object distance generated when the slice image B is displayed on the display panel, and therefore an image distance of an image formed from the slice image A is less than an image distance of an image formed from the slice image B.

Refraction intensity of the refraction variable part refers to a distance that an emergent ray deviates from an incident ray on a second screen, where the emergent ray is obtained after the incident ray is refracted by a first screen and refracted by the second screen. The first screen is a screen formed between the medium padded between the refraction variable part and the display panel and the refraction variable part, and the second screen is a screen formed between the medium padded between the refraction variable part and the lens and the refraction variable part. Larger refraction intensity of the refraction variable part indicates a larger distance that the emergent ray deviates from the incident ray on the second screen.

The refractive index of the medium padded between the display panel and the refraction variable part may be different from the refractive index of the medium padded between the refraction variable part and the lens.

When a difference between equivalent object distances after two slice images that are of a same stereoscopic object and are perpendicular to a same visual axis are refracted by the refraction variable part is greater than zero, an observer can see that slice images of the stereoscopic object are arranged in image space according to an original relative position but a certain spacing exists between two adjacent slice images.

Figure 6:
FIG. 6 is a schematic diagram of a three-dimensional image formed when the three-dimensional image displaying system shown in FIG. 2 is applied in a specific scenario.

As shown in FIG. 6, when a displaying window of an electronic product is used as a slice image, the three-dimensional image displaying system provided in this embodiment of the present invention may also be used to display multiple windows in stereoscopic space. For example, a primary displaying window 61 is displayed at the front, and a first secondary displaying window 62, a second secondary displaying window 63, and the like are then successively displayed at a certain interval behind the primary displaying window 61. In addition, brightness of other secondary displaying windows except the primary displaying window 61 may also be turned down at the same time. In this way, an observer can see a series of displaying windows arranged in a sequence in stereoscopic space.

Optionally, the drive controller is configured to display the slice image of the stereoscopic object on the display panel according to the set sequence and control a thickness of the refraction variable part according to the depth of the slice image in the stereoscopic object when the slice image is displayed on the display panel.

When a refractive index of a medium padded between the display panel and the refraction variable part and the refractive index of the medium padded between the refraction variable part and the lens are less than a refractive index of the refraction variable part, a thickness of the refraction variable part generated when the slice image A is displayed on the display panel is less than a thickness of the refraction variable part generated when the slice image B is displayed on the display panel. When a refractive index of a medium padded between the display panel and the refraction variable part and the refractive index of the medium padded between the refraction variable part and the lens are greater than a refractive index of the refraction variable part, a thickness of the refraction variable part generated when the slice image A is displayed on the display panel is greater than a thickness of the refraction variable part generated when the slice image B is displayed on the display panel.

Figure 7:
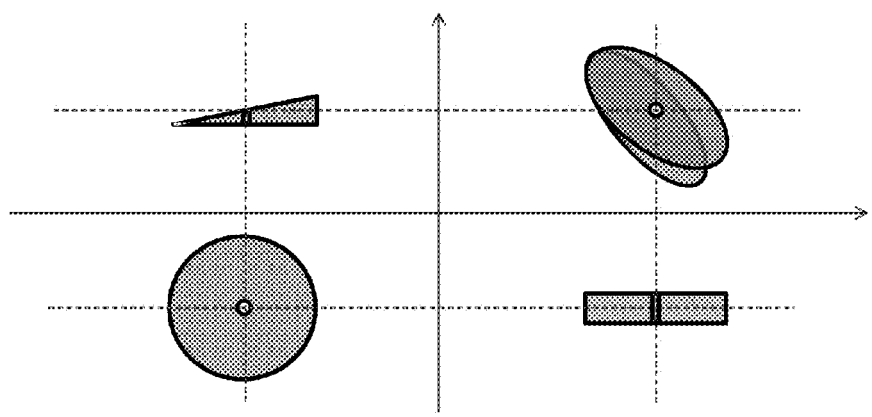
FIG. 7 is a schematic structural diagram of a first implementation manner of a refraction variable part in the three-dimensional image displaying system shown in FIG. 2.
Figure 8:
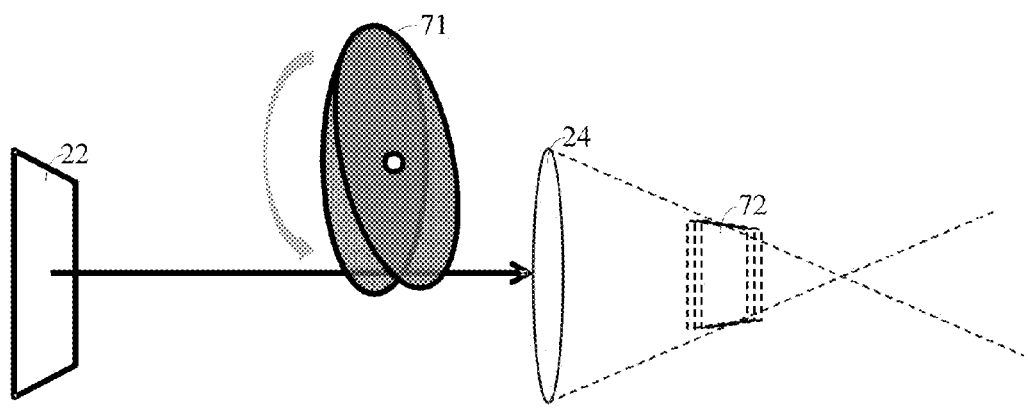
FIG. 8 is a diagram of an optical path for imaging when a refraction variable part in a three-dimensional image displaying system according to an embodiment of the present invention uses the structure shown in FIG. 7.

For example, the refraction variable part may consist of a disk with an uneven thickness. FIG. 7 shows a disk with an uneven thickness and three orthographic views of the disk. When the refraction variable part uses a disk with an uneven thickness, the thickness of the refraction variable part can be changed by rotating a disk 71 with an uneven thickness (as shown in FIG. 8) so as to change refraction intensity of a light ray passing through the refraction variable part and further change an image distance of a slice image displayed on the display panel. In FIG. 8, the display panel 22, the lens 24, and an image 72 formed for a stereoscopic object are further included.

When the refraction variable part in the three-dimensional image displaying system provided in this embodiment of the present invention uses a disk with an uneven thickness, a light ray projected by the display panel 22 passes through an edge of the disk. After the disk with an uneven thickness stably rotates at a certain speed, the thickness of the disk through which the light ray projected by the display panel 22 passes also changes stably. By synchronously adjusting slice images that are of a stereoscopic object and are displayed on the display panel, the drive controller enables a slice image with a larger depth in the stereoscopic object to be displayed on an image plane closer to an observer and a slice image with a smaller depth in the stereoscopic object to be displayed on an image plane far away from the observer. In this way, the observer can see a stereoscopic image of the stereoscopic object.

When the refraction variable part in the three-dimensional image displaying system provided in this embodiment of the present invention uses a disk with an uneven thickness, if slice images of the cube shown in FIG. 3A are displayed, the slice images are displayed according to the following sequence: a slice image 1, a slice image 2, a slice image 3, a slice image 4, a slice image 5, a slice image 6, a slice image 7, a slice image 8, the slice image 8, the slice image 7, the slice image 6, the slice image 5, the slice image 4, the slice image 3, the slice image 2, and the slice image 1.

Optionally, the drive controller is configured to display the slice image of the stereoscopic object on the display panel according to the set sequence and control a refractive index of a material of the refraction variable part according to the depth of the slice image in the stereoscopic object when the slice image is displayed on the display panel.

No matter whether a refractive index of a medium padded between the display panel and the refraction variable part and the refractive index of the medium padded between the refraction variable part and the lens are less than or greater than a refractive index of the refraction variable part, a refractive index of the material of the refraction variable part generated when the slice image A is displayed on the display panel is less than a refractive index of the material of the refraction variable part generated when the slice image B is displayed on the display panel.

The refraction variable part may use an electronically-controlled material with a variable refractive index. A refractive index of the material may be changed by using an electrical signal so as to change refraction intensity of a light ray passing through the refraction variable part and further change an image distance of a slice image displayed on the display panel.

Figure 9:
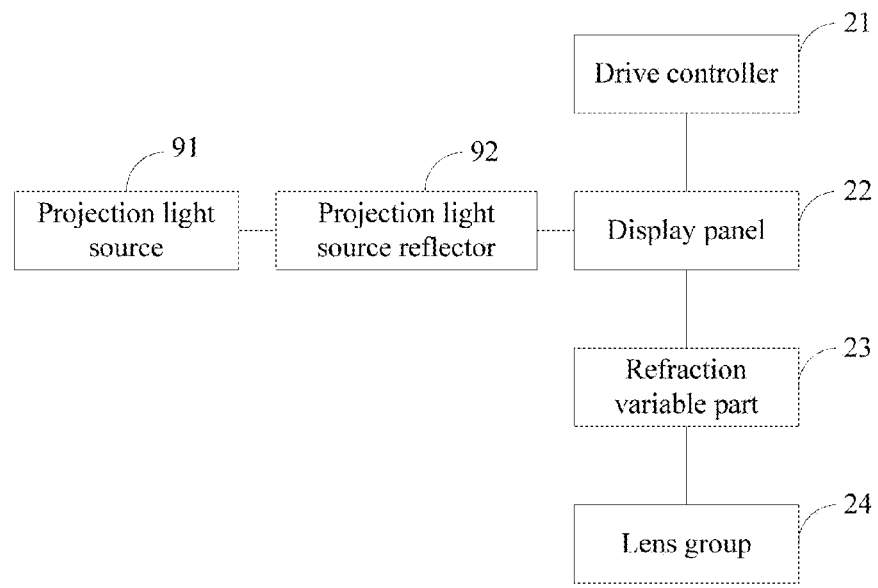
FIG. 9 is a second schematic structural diagram of a three-dimensional image displaying system according to an embodiment of the present invention.

Optionally, when strength of a light ray that the display panel projects onto the refraction variable part is insufficient, the three-dimensional image displaying system provided in this embodiment of the present invention, as shown in FIG. 9, further includes a projection light source 91 and a projection light source reflector 92. The projection light source reflector 92 is configured to reflect a light ray emitted by the projection light source 91 onto the display panel 22 so as to increase strength of a light ray that the display panel 22 projects onto the refraction variable part.

Figure 10:
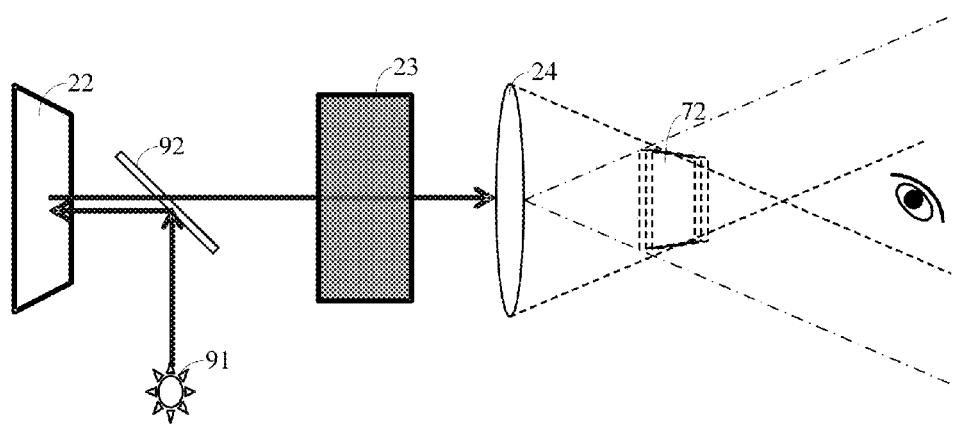
FIG. 10 is a diagram of an optical path when the three-dimensional image displaying system shown in FIG. 9 works.

When an optical path between the display panel and the refraction variable part passes through the projection light source reflector, according to the three-dimensional image displaying system provided in this embodiment of the present invention, as shown in FIG. 10, the projection light source reflector 92 in the system is further configured to transmit a light ray between the display panel 22 and the refraction variable part 23. In this case, the projection light source reflector 92 may be a spectroscope.

When the foregoing three-dimensional image displaying system is used, for a stereoscopic image formed for a stereoscopic object by using the displaying system, the complete stereoscopic image can be seen only in a specific position, that is, only within one limited cone (an area in which an eye is located and is defined by using dashed lines in FIG. 10) of image space. When an eye of an observer is located in an area defined by using dash-and-dot lines in FIG. 10, the observer can only see a part of the stereoscopic image. When an eye of an observer is located in other areas in FIG. 10, the observer cannot see the stereoscopic image.

Figure 11:
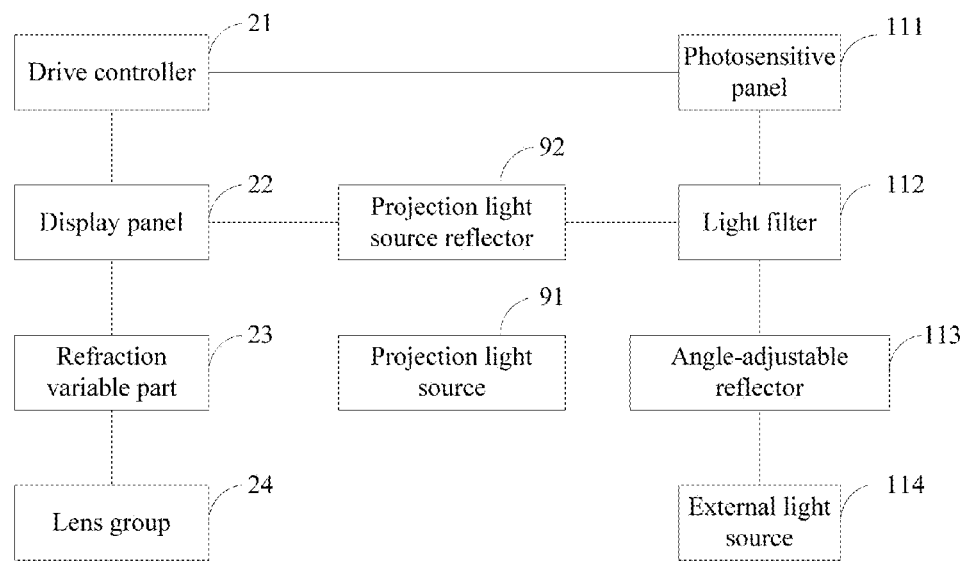
FIG. 11 is a third schematic structural diagram of a three-dimensional image displaying system according to an embodiment of the present invention.

The three-dimensional image displaying system provided in this embodiment of the present invention, as shown in FIG. 11, may further include an angle-adjustable reflector 113, a photosensitive panel 111, and a light filter 112.

The drive controller is further configured to adjust the angle-adjustable reflector 113 to adjust an image formed by a three-dimensional image receiving part and/or an image formed by performing an operation action on a three-dimensional image onto the photosensitive panel 111, where the image formed by a three-dimensional image receiving part is an image formed by the three-dimensional image receiving part by successively using the angle-adjustable reflector 113, the lens 24, the refraction variable part 23, the projection light source reflector 92, and the light filter 112. The image formed by performing an operation action on a three-dimensional image is an image formed by the action by successively using the angle-adjustable reflector 113, the lens 24, the refraction variable part 23, the projection light source reflector 92, and the light filter 112.

The light filter 112 is configured to absorb a light ray that the projection light source 91 irradiates onto the photosensitive panel 111.

The angle-adjustable reflector 113 may be turned by turning two mutually perpendicular axes on a mirror surface of the angle-adjustable reflector 113 so as to adjust the image formed by a three-dimensional image receiving part and/or the image formed by performing an operation action on a three-dimensional image onto the photosensitive panel 111.

The photosensitive panel 111 may be a charge-coupled photosensitive device or a complementary metal-oxide semiconductor photosensitive device.

Before displaying a three-dimensional image of a stereoscopic object, the three-dimensional image displaying system provided in this embodiment of the present invention may first locate a position of the three-dimensional image receiving part by adjusting the angle-adjustable reflector so that the three-dimensional image receiving part is located in an area in which a complete three-dimensional image can be seen.

Optionally, the three-dimensional image displaying system provided in this embodiment of the present invention, as shown in FIG. 11, further includes an external light source 114. The external light source 114 is configured to enhance light intensity surrounding the three-dimensional image receiving part and/or an operator of executing an operation action.

Figure 12:
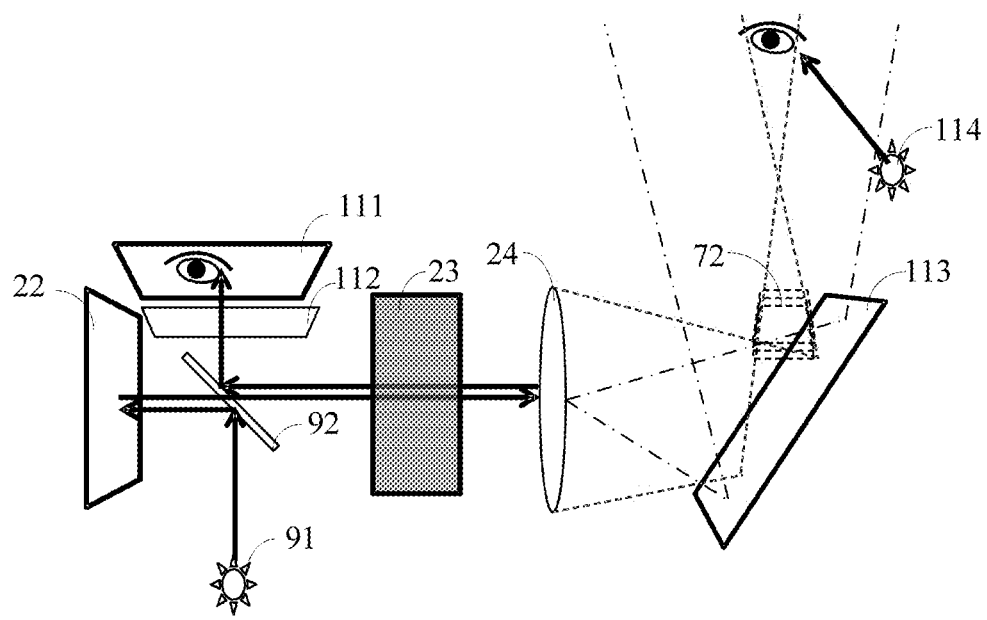
FIG. 12 is a diagram of an optical path for photographing in a first implementation manner of the three-dimensional image displaying system shown in FIG. 11.

If the external light source is an infrared light source, the light filter 112 is an infrared cut-off filter, and the light filter 112 is located between the projection light source 91 and the photosensitive panel 111 and located between the projection light source reflector 92 and the photosensitive panel 111. FIG. 12 shows an optical path of the three-dimensional image displaying system shown in FIG. 11. In FIG. 12, when two eyes of an observer are within a range of a cone in which a complete stereoscopic image can be seen, according to a principle of reversibility of an optical path, the two eyes of the observer are also imaged on the photosensitive panel 111 by means of infrared ray irradiation in the external light source 114 and in an environment. When the two eyes of the observer are imaged in a central position of the photosensitive panel 111, it is most likely that the observer can observe a complete stereoscopic image. Therefore, by using the drive controller, the two eyes of the observer may be detected from an image formed on the photosensitive panel 111, and the angle-adjustable reflector 113 is controlled in real time to rotate to a proper position so that the two eyes of the observer are always imaged in the central position of the photosensitive panel 111. When the light filter 112 is an infrared cut-off filter, light rays except an infrared ray can be absorbed, where the light rays are irradiated onto the photosensitive panel 111 by the projection light source 91. Therefore, in this case, the projection light source 91 may be a light source of non-infrared light, for example, a light source of natural light.

In FIG. 12, the projection light source reflector 92, the refraction variable part 23, the lens 24, the angle-adjustable reflector 113, and the image 72 formed from a slice image of a stereoscopic object are further included.

If the external light source is a light source of natural light, the light filter includes two polarizers that are mutually perpendicular in a polarization direction, where one of the two polarizers is located between the projection light source 91 and the projection light source reflector 92, and the other is located between the projection light source reflector 92 and the photosensitive panel 111. The two polarizers are configured to absorb a light ray that the projection light source irradiates onto the photosensitive panel.

Figure 13:
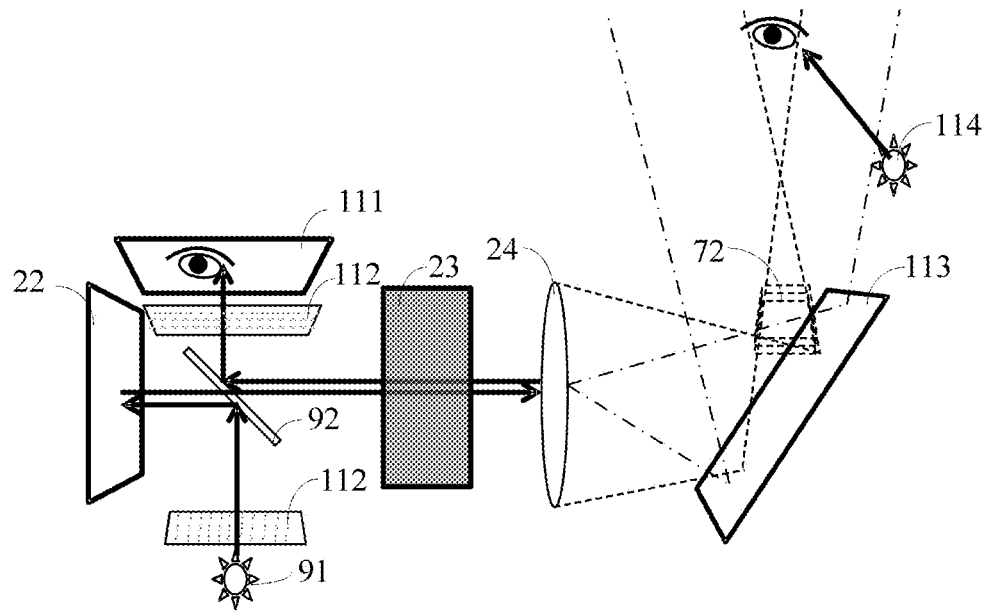
FIG. 13 is a diagram of an optical path for photographing in a second implementation manner of the three-dimensional image displaying system shown in FIG. 11.

If the external light source is a light source of natural light, the light filter includes two polarizers that are mutually perpendicular in a polarization direction. In this case, FIG. 13 shows an optical path of the three-dimensional image displaying system shown in FIG. 11. In FIG. 13, when two eyes of an observer are within a range of a cone in which a complete stereoscopic image can be seen, according to a principle of reversibility of an optical path, the two eyes of the observer are also imaged on the photosensitive panel 111 by means of natural light irradiation in the external light source 114 and in an environment. When the two eyes of the observer are imaged in a central position of the photosensitive panel 111, it is most likely that the observer can observe a complete stereoscopic image. Therefore, by using the drive controller, the angle-adjustable reflector 111 may be controlled in real time to rotate to a proper position so that the two eyes of the observer are always imaged on the photosensitive panel 111 and the two eyes of the observer are always imaged in the central position of the photosensitive panel 111. When the light filter 112 is two polarizers that are mutually perpendicular in a polarization direction, a light ray that the projection light source 91 irradiates onto the photosensitive panel 111 can be absorbed.

In FIG. 13, the projection light source reflector 92, the refraction variable part 23, the lens 24, the angle-adjustable reflector 113, and the image 72 formed from a slice image of a stereoscopic object are further included.

Because the three-dimensional image displaying system provided in this embodiment of the present invention can form a three-dimensional image of a stereoscopic object in a real scenario, a user can touch a stereoscopic image by using a hand or another object. Although no force is fed back when a stereoscopic image is touched, the system can continuously photograph, in the photosensitive panel, a hand or another object touching the stereoscopic image. When photographing an operation action, the system reuses the lens that is used for projecting a stereoscopic object as a three-dimensional image. Therefore, image space formed when an operation action is photographed completely corresponds to object space, namely space in which a slice image is located, formed when a stereoscopic object is imaged.

Therefore, optionally, if the image formed on the photosensitive panel in the three-dimensional image displaying system provided in this embodiment of the present invention includes the image formed by performing an operation action on a three-dimensional image, the drive controller in the system is further configured to determine an operation instruction according to the image formed by the operation action on the photosensitive panel in the system, where the operation action is performed on the three-dimensional image formed for the stereoscopic object, and re-perform imaging on the stereoscopic object according to the determined operation instruction.

In an actual application, a function of detecting an operation action may be added in the drive controller, for example, operation actions such as scrolling or moving a stereoscopic object leftward, rightward, upward, and downward, and clicking a position of a stereoscopic object. In addition, a specific operation action may be defined to indicate pushing a stereoscopic object forward or pulling a stereoscopic object backward, for example, it is defined that opening a palm indicates pushing a stereoscopic object forward and making a first indicates pulling a stereoscopic object backward. Based on a correspondence between these operation actions and operation instructions, a user can perform any three-dimensional operation on a stereoscopic object.

For example, when an operation action photographed by the photosensitive panel is opening a palm, the drive controller determines, according to a correspondence between an operation action and an operation instruction, that an operation instruction is pushing a stereoscopic object forward. Then, when imaging is performed on a stereoscopic object, the system increases refraction intensity of the refraction variable part for a light ray so that a three-dimensional image formed for the stereoscopic object is closer to the lens in the system, that is, the three-dimensional image is far away from an observer. When an operation action photographed by the photosensitive panel is moving upward, the drive controller determines, according to a correspondence between an operation action and an operation instruction, that an operation instruction is moving a stereoscopic object upward. Then, the drive controller re-determines a slice image of a stereoscopic object according to a new visual axis of the moved stereoscopic object that is observed, and then re-projects the stereoscopic object as a three-dimensional image according to the re-determined slice image of the stereoscopic object.

The embodiments of the present invention further provide a three-dimensional image displaying method and apparatus. The three-dimensional image displaying system provided in the embodiment of the present invention is used as a hardware basis in implementation of the method and the apparatus. Therefore, for the implementation of the method and the apparatus, reference may be made to implementation of the aforementioned system, and repeated content is not described again.

Figure 14:
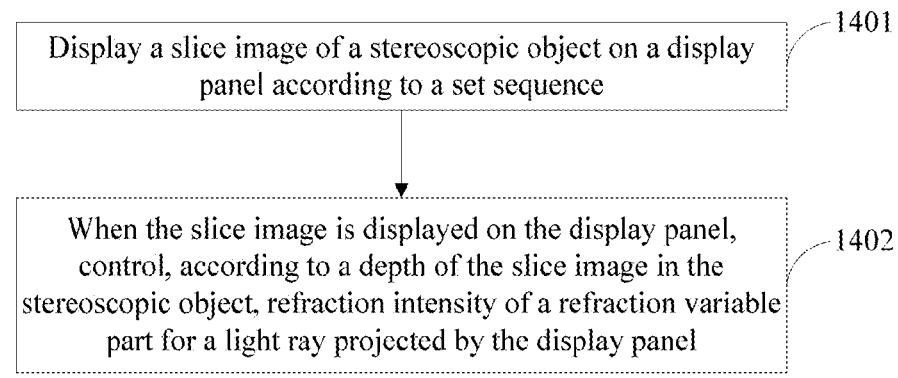
FIG. 14 is a first flowchart of a three-dimensional image displaying method according to an embodiment of the present invention.

A three-dimensional image displaying method provided in an embodiment of the present invention, as shown in FIG. 14, includes the following.

S1401: Display a slice image of a stereoscopic object on a display panel according to a set sequence.

S1402: When the slice image is displayed on the display panel, control, according to a depth of the slice image in the stereoscopic object, refraction intensity of a refraction variable part for a light ray projected by the display panel.

A light ray refracted by the refraction variable part is imaged through a lens. A time required for successively displaying all slice images, which are of the stereoscopic object to be imaged and are perpendicular to one visual axis, on the display panel at a time according to the set sequence is less than a time of persistence of vision.

S1401 and S1402 are synchronously performed.

Optionally, for two slice images that are of a same stereoscopic object and are perpendicular to one visual axis, a distance between an image formed from a slice image with a larger depth in the stereoscopic object and a three-dimensional image receiving part is greater than a distance between an image formed from a slice image with a smaller depth in the stereoscopic object and the three-dimensional image receiving part. An image formed from one slice image is an image formed after a refracted light ray passes through the lens when the one slice image is displayed on the display panel, where the refracted light ray is obtained after a light ray projected by the display panel is refracted by the refraction variable part according to the refraction intensity controlled by the drive controller.

Figure 15:
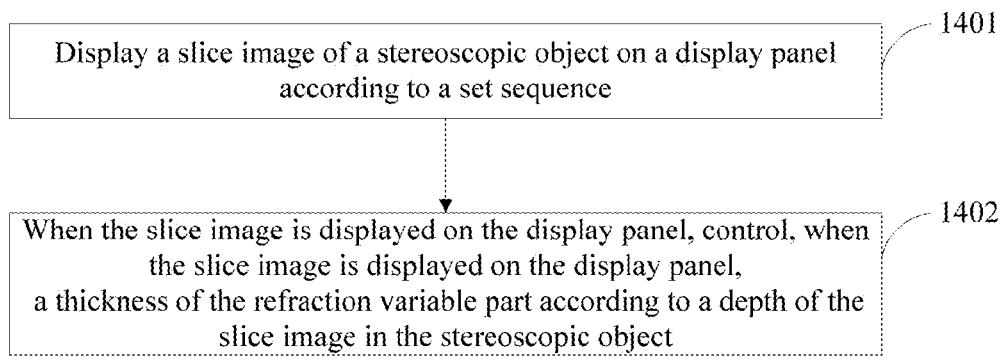
FIG. 15 is a second flowchart of a three-dimensional image displaying method according to an embodiment of the present invention.

Optionally, as shown in FIG. 15, S1402 includes controlling a thickness of the refraction variable part according to the depth of the slice image in the stereoscopic object when the slice image is displayed on the display panel.

Figure 16:
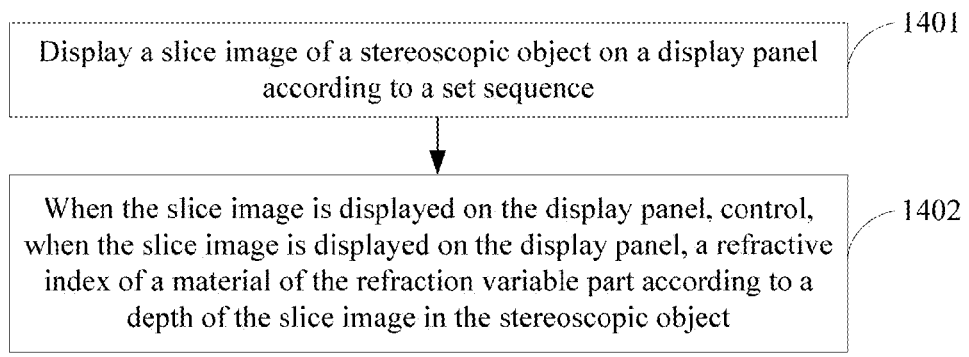
FIG. 16 is a third flowchart of a three-dimensional image displaying method according to an embodiment of the present invention.

Optionally, as shown in FIG. 16, S1402 includes controlling a refractive index of a material of the refraction variable part according to the depth of the slice image in the stereoscopic object when the slice image is displayed on the display panel.

Figure 17:
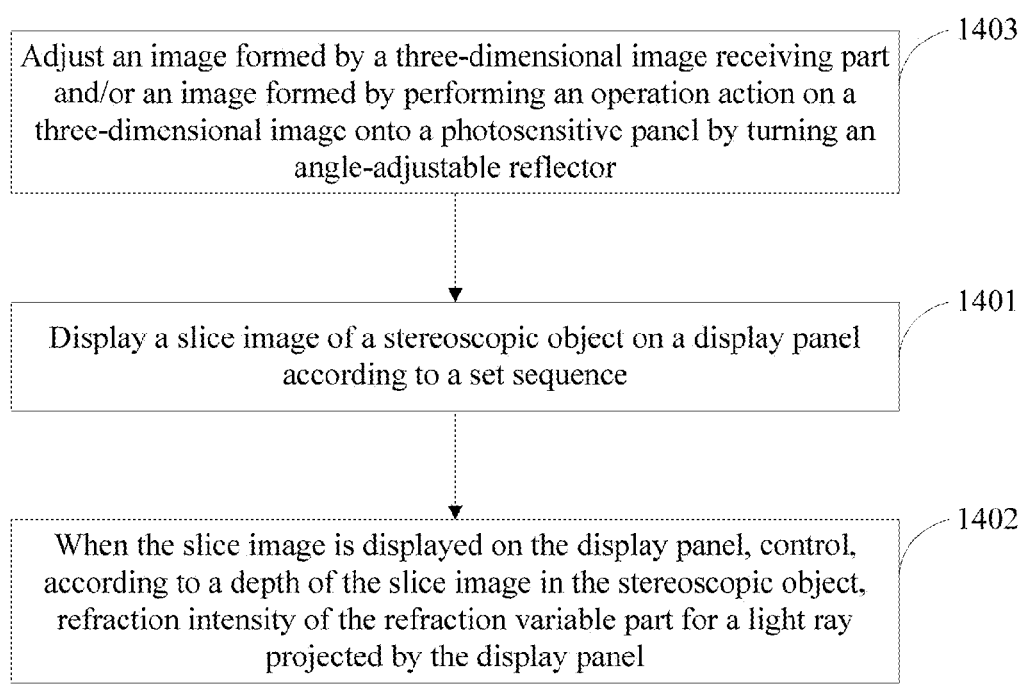
FIG. 17 is a fourth flowchart of a three-dimensional image displaying method according to an embodiment of the present invention.

Optionally, as shown in FIG. 17, the three-dimensional image displaying method provided in this embodiment of the present invention further includes the following.

S1403: Adjust an image formed by a three-dimensional image receiving part and/or an image formed by performing an operation action on a three-dimensional image onto a photosensitive panel by adjusting an angle-adjustable reflector.

The image formed by a three-dimensional image receiving part is an image formed by the three-dimensional image receiving part by successively using the angle-adjustable reflector, the lens, the refraction variable part, a projection light source reflector configured to reflect a light ray emitted by a projection light source onto the display panel, and a light filter configured to absorb a light ray that the projection light source irradiates onto the photosensitive panel.

The image formed by performing an operation action on a three-dimensional image is an image formed by the action by successively using the angle-adjustable reflector, the lens, the refraction variable part, the projection light source reflector, and the light filter.

S1403 is executed before S1401 and S1402. A position of the image formed by a three-dimensional image receiving part is adjusted, that is, an imaging area of the slice image of the stereoscopic is adjusted, so that the three-dimensional image receiving part is located in an area in which a complete three-dimensional image can be received.

Figure 18:
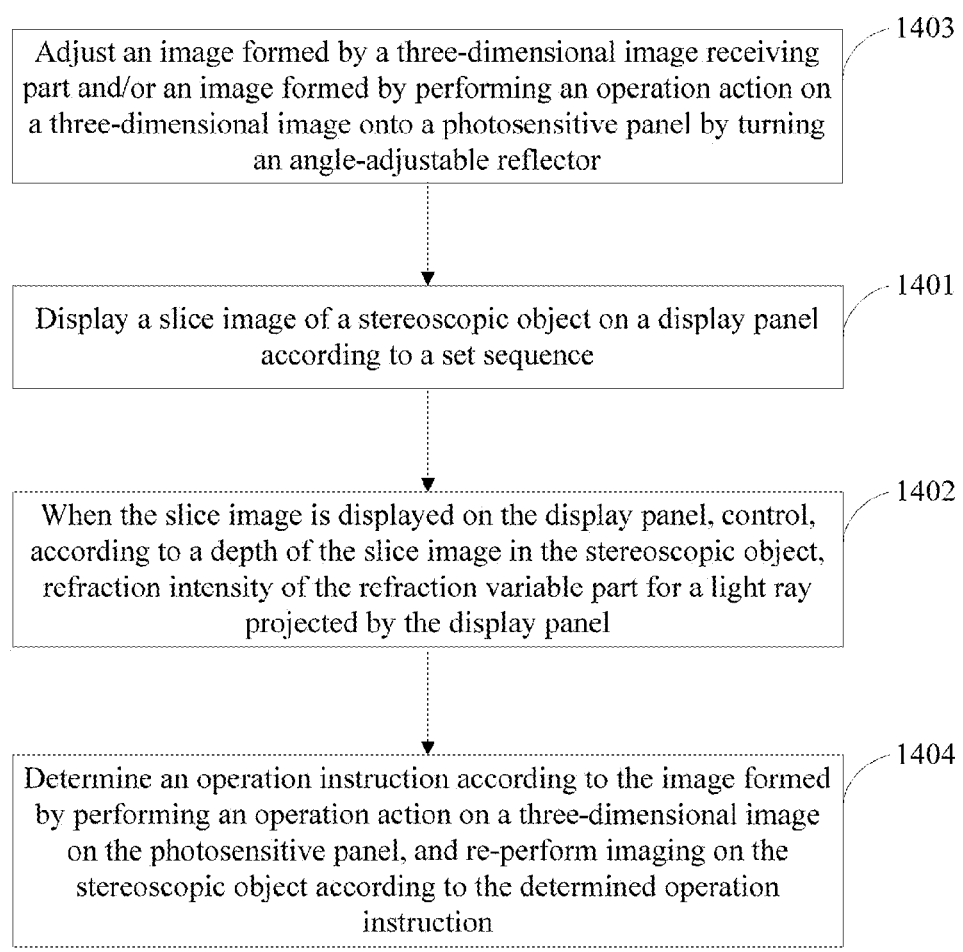
FIG. 18 is a fifth flowchart of a three-dimensional image displaying method according to an embodiment of the present invention.

Optionally, if the image formed on the photosensitive panel includes the image formed by performing an operation action on a three-dimensional image, as shown in FIG. 18, the three-dimensional image displaying method provided in this embodiment of the present invention further includes the following.

S1404: Determine an operation instruction according to the image formed by the operation action on the photosensitive panel, and re-perform imaging on the stereoscopic object according to the determined operation instruction.

S1404 is executed after S1403, and there is no time sequence between S1404 and S1401 or between S1404 and S1402.

Figure 19:
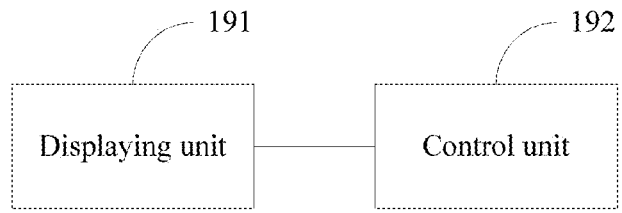
FIG. 19 is a first schematic structural diagram of a three-dimensional image displaying apparatus according to an embodiment of the present invention.

A three-dimensional image displaying apparatus provided in an embodiment of the present invention, as shown in FIG. 19, includes a displaying unit 191 configured to display a slice image of a stereoscopic object on a display panel according to a set sequence, and a control unit 192 configured to control, according to a depth of the slice image in the stereoscopic object, refraction intensity of a refraction variable part for a light ray projected by the display panel when the slice image is displayed on the display panel, where a light ray refracted by the refraction variable part is imaged through a lens, and a time required for successively displaying all slice images, which are of the stereoscopic object to be imaged and are perpendicular to one visual axis, on the display panel at a time according to the set sequence is less than a time of persistence of vision.

Optionally, for two slice images of a same stereoscopic object, an image distance generated after one slice image with a larger depth in the stereoscopic object is imaged through the lens is less than an image distance generated after the other slice image with a smaller depth in the stereoscopic object is imaged through the lens.

Optionally, a distance between image planes formed after two slice images of a same stereoscopic object pass through the lens is not less than a difference between depths of the two slice images in the stereoscopic object. An image plane formed after one slice image passes through the lens is an image plane formed after a refracted light ray passes through the lens when the one slice image is displayed on the display panel, where the refracted light ray is obtained after a light ray projected by the display panel is refracted by the refraction variable part.

Optionally, the control unit is configured to control a thickness of the refraction variable part according to the depth of the slice image in the stereoscopic object when the slice image is displayed on the display panel.

Optionally, the control unit is configured to control a refractive index of a material of the refraction variable part according to the depth of the slice image in the stereoscopic object when the slice image is displayed on the display panel.

Figure 20:
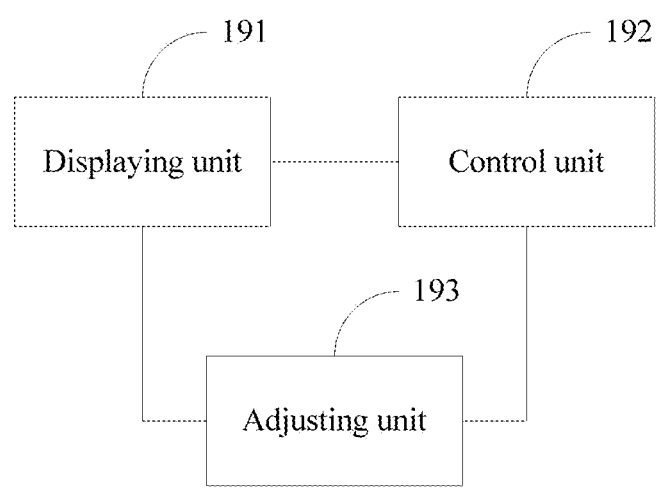
FIG. 20 is a second schematic structural diagram of a three-dimensional image displaying apparatus according to an embodiment of the present invention.

Optionally, as shown in FIG. 20, the three-dimensional image displaying apparatus provided in this embodiment of the present invention further includes an adjusting unit 193. The adjusting unit 193 is configured to adjust an image formed by a three-dimensional image receiving part and/or an image formed by performing an operation action on a three-dimensional image onto a photosensitive panel by adjusting an angle-adjustable reflector.

The image formed by a three-dimensional image receiving part is an image formed by the three-dimensional image receiving part by successively using the angle-adjustable reflector, the lens, the refraction variable part, a projection light source reflector configured to reflect a light ray emitted by a projection light source onto the display panel, and a light filter configured to absorb a light ray that the projection light source irradiates onto the photosensitive panel.

The image formed by performing an operation action on a three-dimensional image is an image formed by the action by successively using the angle-adjustable reflector, the lens, the refraction variable part, the projection light source reflector, and the light filter.

Optionally, if the image formed on the photosensitive panel includes the image formed by performing an operation action on a three-dimensional image, the adjusting unit 193 is further configured to determine an operation instruction according to the image formed by the operation action on the photosensitive panel, and re-perform imaging on the stereoscopic object according to the determined operation instruction.

Persons skilled in the art should understand that the embodiments of the present invention may be provided as a method, a system, or a computer program product. Therefore, the present invention may use a form of hardware only embodiments, software only embodiments, or embodiments with a combination of software and hardware. Moreover, the present invention may use a form of a computer program product that is implemented on one or more computer-usable storage media (including but not limited to a disk memory, a compact disc read only memory (CD-ROM), an optical memory, and the like) that include computer-usable program code.

The present invention is described with reference to the flowcharts and/or block diagrams of the method, the device (system), and the computer program product according to the embodiments of the present invention. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine so that the instructions executed by a computer or a processor of any other programmable data processing device generate an apparatus for implementing a specific function in one or more processes in the flowcharts and/or in one or more blocks in the block diagrams.

These computer program instructions may also be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may also be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Although some preferred embodiments of the present invention have been described, persons skilled in the art can make changes and modifications to these embodiments once they learn the basic inventive concept. Therefore, the following claims are intended to be construed as to cover the preferred embodiments and all changes and modifications falling within the scope of the present invention.

Persons skilled in the art can make various modifications and variations to the embodiments of the present invention without departing from the spirit and scope of the embodiments of the present invention. The present invention is intended to cover these modifications and variations provided that they fall within the scope of protection defined by the following claims and their equivalent technologies.

What is claimed is:

1. A three-dimensional image displaying system, comprising:
   a drive controller;
   a display panel operably coupled to the drive controller;

a refraction variable part operably coupled to the display panel, the refraction variable part comprising a disk of uneven thickness, a first side, and a second side; and a lens operably coupled to the refraction variable part, wherein the drive controller is configured to display a slice image of a stereoscopic object on the display panel according to a set sequence and control, according to a depth of the slice image in the stereoscopic object, refraction intensity of the refraction variable part for a light ray projected by the display panel when the slice image is displayed on the display panel, wherein a time required for successively displaying all slice images, which are of the stereoscopic object to be imaged and are perpendicular to one visual axis, on the display panel at a time according to the set sequence is less than a time of persistence of vision, wherein the display panel is configured to display the slice image under control of the drive controller, wherein a thickness of the refraction variable part may be changed by rotating the disk, wherein the refraction variable part is configured to perform, according to the refraction intensity controlled by the drive controller, refraction on the light ray projected by the display panel, wherein the light ray passes through the refraction variable part by entering the first side and exiting the second side, and wherein the lens is configured to perform imaging according to a light ray refracted by the refraction variable part.

2. The system according to claim 1, wherein for two slice images that are of a same stereoscopic object and are perpendicular to one visual axis, a distance between an image formed from a slice image with a larger depth in the stereoscopic object and a three-dimensional image receiving part is greater than a distance between an image formed from a slice image with a smaller depth in the stereoscopic object and the three-dimensional image receiving part, wherein an image formed from one slice image is an image formed after a refracted light ray passes through the lens when the one slice image is displayed on the display panel, and wherein the refracted light ray is obtained after a light ray projected by the display panel is refracted by the refraction variable part according to the refraction intensity controlled by the drive controller.

3. The system according to claim 1, wherein the drive controller is further configured to display the slice image of the stereoscopic object on the display panel according to the set sequence and control the thickness of the refraction variable part according to the depth of the slice image in the stereoscopic object when the slice image is displayed on the display panel.

4. The system according to claim 1, wherein the drive controller is further configured to display the slice image of the stereoscopic object on the display panel according to the set sequence and control a refractive index of a material of the refraction variable part according to the depth of the slice image in the stereoscopic object when the slice image is displayed on the display panel.

5. The system according to claim 1, wherein the system further comprises a projection light source and a projection light source reflector operably coupled to the display panel, and wherein the projection light source reflector is configured to reflect a light ray emitted by the projection light source onto the display panel.

6. The system according to claim 5, wherein an optical path between the display panel and the refraction variable part passes through the projection light source reflector, and wherein the projection light source reflector is further configured to transmit a light ray between the display panel and the refraction variable part.

7. The system according to claim 6, wherein the system further comprises:

a photosensitive panel operably coupled to the drive controller;

a light filter operably coupled to the projection light source filter; and an angle-adjustable reflector operably coupled to the light filter;

wherein the drive controller is further configured to adjust an image formed by a three-dimensional image receiving part or an image formed by performing an operation action on a three-dimensional image onto the photosensitive panel by adjusting the angle-adjustable reflector, wherein the image formed by the three-dimensional image receiving part is kept in a central position of the photosensitive panel by adjusting the angle-adjustable reflector controlled by the drive controller;

wherein the image formed by a three-dimensional image receiving part is an image formed by the three-dimensional image receiving part by successively using the angle-adjustable reflector, the lens, the refraction variable part, the projection light source reflector, and the light filter, wherein the image formed by performing an operation action on a three-dimensional image is an image formed by the action by successively using the angle-adjustable reflector, the lens, the refraction variable part, the projection light source reflector, and the light filter, and wherein the light filter is configured to absorb a light ray that the projection light source irradiates onto the photosensitive panel.

8. The system according to claim 7, wherein the system further comprises an external light source operably coupled to the angle-adjustable reflector, wherein the external light source is configured to enhance light intensity surrounding the three-dimensional image receiving part or an operator of executing an operation action, wherein the light filter comprises an infrared cut-off filter located between the projection light source and the photosensitive panel and between the projection light source reflector and the photosensitive panel when the external light source is an infrared light source, wherein the light filter comprises two polarizers that are mutually perpendicular in a polarization direction when the external light source is a light source of natural light, and wherein one of the two polarizers is located between the projection light source and the projection light source reflector and the other is located between the projection light source reflector and the photosensitive panel.

9. The system according to claim 7, wherein the drive controller is further configured to determine an operation instruction according to the image formed by the operation action on the photosensitive panel and re-perform imaging on the stereoscopic object according to the determined operation instruction when the image formed on the photosensitive panel comprises the image formed by performing an operation action on a three-dimensional image.

10. A three-dimensional image displaying method, comprising:

displaying a slice image of a stereoscopic object on a display panel according to a set sequence; and controlling, according to a depth of the slice image in the stereoscopic object, refraction intensity of a refraction variable part for a light ray projected by the display panel when the slice image is displayed on the display panel, wherein the light ray passes through the refraction variable part by entering a first side and exiting a second side of the refraction variable part, wherein the refraction variable part comprises a disk of uneven thickness, wherein a thickness of the refraction variable part is changed by rotating the disk, wherein a light ray refracted by the refraction variable part is imaged through a lens, and wherein a time required for successively displaying all slice images, which are of the stereoscopic object to be imaged and are perpendicular to one visual axis, on the display panel at a time according to the set sequence is less than a time of persistence of vision.

11. The method according to claim 10, wherein for two slice images that are of a same stereoscopic object and are perpendicular to one visual axis, a distance between an image formed from a slice image with a larger depth in the stereoscopic object and a three-dimensional image receiving part is greater than a distance between an image formed from a slice image with a smaller depth in the stereoscopic object and the three-dimensional image receiving part, wherein an image formed from one slice image is an image formed after a refracted light ray passes through the lens when the one slice image is displayed on the display panel, and wherein the refracted light ray is obtained after a light ray projected by the display panel is refracted by the refraction variable part according to the refraction intensity controlled by a drive controller.

12. The method according to claim 10, wherein the controlling comprises controlling the thickness of the refraction variable part according to the depth of the slice image in the stereoscopic object when the slice image is displayed on the display panel.

13. The method according to claim 10, wherein the controlling comprises controlling a refractive index of a material of the refraction variable part according to the depth of the slice image in the stereoscopic object when the slice image is displayed on the display panel.

14. The method according to claim 10, wherein the method further comprises:
adjusting an image formed by a three-dimensional image receiving part or an image formed by performing an operation action on a three-dimensional image onto a photosensitive panel by adjusting an angle-adjustable reflector,
wherein the image formed by the three-dimensional image receiving part is kept in a central position of the photosensitive panel by adjusting the angle-adjustable reflector controlled by the drive controller;
wherein the image formed by a three-dimensional image receiving part is an image formed by the three-dimensional image receiving part by successively using the angle-adjustable reflector, the lens, the refraction variable part, a projection light source reflector configured to reflect a light ray emitted by a projection light source onto the display panel, and a light filter configured to absorb a light ray that the projection light source irradiates onto the photosensitive panel, and
wherein the image formed by performing an operation action on a three-dimensional image is an image formed by the action by successively using the angle-adjustable reflector, the lens, the refraction variable part, the projection light source reflector, and the light filter.

15. The method according to claim 14, wherein the method further comprises:
determining an operation instruction according to the image formed by the operation action on the photosensitive panel; and
re-performing imaging on the stereoscopic object according to the determined operation instruction when the image formed on the photosensitive panel comprises the image formed by performing an operation action on a three-dimensional image.

16. A three-dimensional image displaying apparatus, comprising:
a display panel;
a light source reflector;
a photosensitive panel;
a refractive variable part comprising a disk of uneven thickness, a first side, and a second side, wherein a thickness of the refraction variable part varies based upon rotation of the disk;
an angle-adjustable reflector; and
a processor coupled to the display panel, the light source reflector, the photosensitive panel, the refractive variable part, and the angle-adjustable reflector, the processor configured to:
detect an image of a three-dimensional image receiving part reflected from the angle-adjustable reflector to the light source reflector to the photosensitive panel;
adjust the angle-adjustable reflector such that the image of the three-dimensional image receiving part is centered on the photosensitive panel;
control the display panel to display a slice image of a stereoscopic object;
rotate the refraction variable part based on a depth of the slice image in the stereoscopic object and a corresponding refraction intensity of the refraction variable part, wherein the corresponding refraction intensity is determined based upon the thickness of the refractive variable part at a first position,
wherein the slice image is reflected to the three-dimensional image receiving part via the angle-adjustable reflector.

17. The three-dimensional image displaying apparatus of claim 16, wherein the three-dimensional image receiving part comprises a pair of eyes of an observer.

18. The three-dimensional image displaying apparatus of claim 16, further comprising a projection light source configured to reflect projection light onto the display panel via the light source reflector.

19. The three-dimensional image displaying apparatus of claim 16, further comprising:
an external light source configured to illuminate the three-dimensional image receiving part; and
a light filter configured to filter light of different wavelengths than light of the external light source.

* * * * *

UNITED STATES PATENT AND TRADEMARK OFFICE
CERTIFICATE OF CORRECTION

PATENT NO. : 10,051,261 B2  
APPLICATION NO. : 14/586273  
DATED : August 14, 2018  
INVENTOR(S) : Zejin Guo, Feng He and Bin Wu Page 1 of 1

It is certified that error appears in the above-identified patent and that said Letters Patent is hereby corrected as shown below:

On the Title Page

Item [56], Line 5: "Ijzernnan" should read "Ijzerman"

Signed and Sealed this  
Twenty-fifth Day of September, 2018

Andrei Iancu  
*Director of the United States Patent and Trademark Office*